United States Patent
Aruga et al.

(10) Patent No.: US 7,125,515 B2
(45) Date of Patent: Oct. 24, 2006

(54) ALUMINUM BASE ALLOY CONTAINING BORON AND MANUFACTURING METHOD THEREOF

(75) Inventors: Yasuhiro Aruga, Kobe (JP); Katsura Kajihara, Kobe (JP); Yasuaki Sugizaki, Kobe (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 159 days.

(21) Appl. No.: 10/413,158

(22) Filed: Apr. 15, 2003

(65) Prior Publication Data

Related U.S. Application Data

(63) Continuation of application No. 09/797,871, filed on Mar. 5, 2001, now abandoned.

(30) Foreign Application Priority Data

| Mar. 3, 2000 | (JP) | ............................. 2000-059433 |
| Oct. 23, 2000 | (JP) | ............................. 2000-323142 |

(51) Int. Cl.
*B22D 30/00* (2006.01)
*C22F 1/04* (2006.01)

(52) U.S. Cl. ...................... 420/528; 148/550; 148/552; 164/457

(58) Field of Classification Search ............... 148/550, 148/552; 420/528, 535, 553; 164/457
See application file for complete search history.

(56) References Cited

U.S. PATENT DOCUMENTS

| 4,595,559 A | 6/1986 | Planchamp |
| 4,806,307 A | 2/1989 | Hirose et al. |
| 5,925,313 A | 7/1999 | Kajihara et al. |

FOREIGN PATENT DOCUMENTS

| DE | 43 08 612 | 9/1994 |
| FR | 2 733 997 | 11/1996 |
| JP | 1-312043 | 12/1989 |
| JP | 1-312044 | 12/1989 |
| JP | 4-333542 | 11/1992 |
| JP | 9-165637 | 6/1997 |

OTHER PUBLICATIONS

Patent Abstracts of Japan, JP 61-235523, Oct. 20, 1986.
R. R. Burn, Trans. Am. Nucl. Soc., vol. 73, pp. 407-408, "Ford Nuclear Reactor Shim-Safety Rod Replacement", 1995.

*Primary Examiner*—George Wyszomierski
*Assistant Examiner*—Janelle Morillo
(74) *Attorney, Agent, or Firm*—Oblon, Spivak, McClelland, Maier & Neustadt, P.C.

(57) ABSTRACT

A aluminum base alloy containing boron and manufacturing method thereof, said alloy exhibiting good mechanical properties (such as high-temperature strength and creep strength) over a long period of time and also having a neutron absorbing capacity owing to boron present therein in the form of a compound without segregation. The alloy contains 0.5–10 mass % of boron with an isotopic element satisfying a relation of $^{10}B/(^{10}B + ^{11}B) \leq 30\%$. said boron being present in the form of a boron compound which is 300 μm or below in size. The alloy is obtained by melting at a temperature in excess of 950° C. and cast at a temperature in the range of 800° C. to 950° C., in such a way that the molten metal is kept for 60–180° seconds until it cools from 950° C. to the casting temperature.

5 Claims, No Drawings

ALUMINUM BASE ALLOY CONTAINING BORON AND MANUFACTURING METHOD THEREOF

BACK OF THE INVENTION

1. Field of the Invention

The present invention relates to an aluminum base alloy containing boron having a neutron absorbing capacity and an ability to maintain the sub-criticality of fuel assemblies which is effective for a structural material (basket material) for a transporting packaging (cask) for transporting spent nuclear fuel or a storage cask container and the like, and its manufacturing method.

2. Description of the Related Art

Spent nuclear fuel has to be stored stable for a long period of time without the possibility of recriticality and radiation leakage. To this end, various investigations have been made on the design and the basket material of its cask containers. Such a material is required to have a capacity to shield and absorb neutrons and to effectively cool spent fuel. Spent fuel is as hot as 100–300° C., and spent fuel needs storage for a long period of time (tens of years). Therefore, the basket material for cask has to be made from a material which keeps creep strength and mechanical properties at high temperatures.

A conventional material in general use for the basket material for a transporting cask and a storage cask container is an aluminum base alloy containing boron which is considered to be superior in capacity to shield and absorb neutrons. Attempts have been made to protect the original mechanical and physical properties of the aluminum base alloy from being adversely affected by boron contained thereinto for neutron shield and absorption.

For example, boron added to an aluminum base alloy containing magnesium as a constituent forms an intermetallic compound with magnesium which crystallizes and precipitates, thereby decreasing the amount of magnesium in the form of solid solution, with the result that the decrease in strength of the aluminum base alloy is caused. A method of addressing this problem was disclosed Japanese Patent Laid-open No. 312043/1989. This method involves the addition of in the form of powder of magnesium-free $AlB_{12}$ compound, so as to suppress the reaction between boron and magnesium, thereby preventing a possible decrease in strength due to the formation of these intermetallic compounds. In addition, Japanese Patent Laid-open No. 312044/1989 discloses another method in which a melting processing is carried out in a high temperature region of 1200° C. or more in order to restrict a reaction between B and Mg by adding boron in the form of powder. Furthermore, Japanese Patent Laid-open No. 333542/1992 discloses a method of producing an aluminum base alloy containing boron which has a low viscosity and hence is superior in castability. This method involves reacting $KBF_{14}$ with Al within a temperature range of 680 to 850° C. and subsequently adding a small amount of $K_2TiF_6$ in the melts of Al—B alloy containing the generated $AlB_2$ crystal. In this way it is possible to eliminate a high viscosity of the melts and improve a castability.

The present inventors had carried out investigations on the development of the above-mentioned aluminum base alloy containing boron. One result of the investigations was disclosed in U.S. Pat. No. 5,925,313. The disclosed an aluminum base alloy containing boron, which has an enhanced capacity to absorb neutrons, is characterized in having a content of isotope $^{10}B$ of 95% or more (satisfying a relation of $^{10}B/(^{10}B+^{11}B) \geq 95\%$. Originally, boron has an isotope composition composed of $^{10}B$ and $^{11}B$, and boron having a superior neutron absorbing capacity is mainly $^{10}B$. In addition, the aluminum base alloy contains boron in the form of $AlB_2$ dispersed in the alloy, so that the alloy exhibits a stable neutron shielding capacity and an ability to recycle the scrap alloy.

Unfortunately, the aluminum base alloy containing boron (or boron-containing aluminum) proposed so far suffers the disadvantage of being unable to maintain its high-temperature strength and creep strength for a long period of time which are characteristic properties required of the basket material for cask to store spent fuel. Another disadvantage is that the basket material (sheet or extended pipe and the like) as a whole does not fully function to absorb neutrons because of the microscopic segregation or the gravity segregation in the ingot.

OBJECT AND SUMMARY OF THE INVENTION

The present invention was completed in view of the foregoing. It is an object of the present invention to provide an aluminum base alloy containing boron and the manufacturing method, said alloy being characterized by its mechanical properties (such as strength and creep strength) that last for a long period of time at high temperatures and by its ability to absorb neutrons and to maintain the sub-criticality of fuel assemblies and, with boron remaining in the form of compound in the alloy without segregation.

The present invention is directed to an aluminum base alloy containing boron which contains 0.5–10% of boron with an isotopic composition satisfying a relation of $^{10}B/(^{10}B+^{11}B) \geq 30\%$, said boron being present in the form of a boron compound which is 300 μm or less in size.

The present invention is also directed to an aluminum base alloy containing boron which contains 0.5–10% of boron with an isotopic composition satisfying a relation of $^{10}B/(^{10}B+^{11}B) \geq 30\%$, said boron being present in the form of a compound containing aluminum and boron which is 300 μm or less in size.

The present invention is also directed to an aluminum base alloy containing boron which contains 0.5–10% of boron with an isotopic composition satisfying a relation of $^{10}B/(^{10}B+^{11}B) \geq 30\%$, said boron being present in the form of a compound containing, in addition to aluminum and boron, at least one element selected from the group composed of Mg, Mn, Si, and Cu, which is 300 μm or less in size. In a preferred embodiment, the aluminum base alloy containing boron contains boron such that the boron compounds (in which the total amount of those elements selected from the group composed of Mg, Mn, Si, and Cu is 0.01–50 atom %) occupy 50% or more with the number proportion in all the boron compounds.

An aluminum base alloy containing boron, which the difference is 1.0% or less in the maximum and minimum value of the B quantity of the specimen that divided the alloy in the plural.

The manufacturing method of the present invention has a feature that (1) a melting temperature is controlled in excess of 950° C. and a casting temperature is in the range of 800° C. to 950° C., and the holding or cooling time from 950° C. to the casting temperature is in the range of 60–1800 seconds, (2) the hot rolling or hot forging temperature is in the range of 250–600° C. in such a way that the rate of reduction per pass is 40% or below and the total reduction is 50% or more, and (3) temperature extruded is in the range of 400–550° C. If necessary, the above-mentioned three requirements may be combined with one another. [For example, (1)+(2) or (1)+(3).] The method that mentioned above causes the boron compound to be fine in size 300 μm or less and hence contributes to its uniform distribution in the aluminum base alloy.

DESCRIPTION OF THE PREFERRED EMBODIMENTS

In order to complete the present invention, the present inventors carried out a series of researches which led to the finding that the aluminum base alloy containing boron exhibits good high-temperature strength and creep strength if it is contained boron satisfying the relation of $^{11}B/(^{10}B+^{11}B)$ is larger than a certain value and it processes melting, casting and hot working (such as rolling and extrusion) under adequate conditions so that the boron compound in the alloy is not larger than 300 μm in size.

The neutron absorbing capacity of an aluminum base alloy containing B is secured even if it depends on large amount of original boron (which is a isotope composition composed of 20% of $^{10}B$). Unfortunately, boron in the aluminum base alloy exists in the form of compound and the amount of the boron compound increases as the content of boron increases. This boron compound exerts the influence on the decline of the high-temperature strength and creep strength of the aluminum base alloy. Therefore, it is necessary that the content of boron be 10% or less in the aluminum base alloy of the present invention. With a boron content higher than 10%, the aluminum base alloy will be remarkably poor in mechanical properties.

On the other hand, with a boron content less than 0.5%, the aluminum base alloy does not absorb as many neutrons as required even though all of the boron contained is composed of $^{10}B$. One way to cope with this situation is to increase the wall thickness of the basket material. However, this is not practical because the cask container becomes large in size (which is uneconomical) and less efficient in heat removal.

For the reasons mentioned above, the aluminum base alloy containing boron of the present invention should contain boron in an amount of 0.5–10%. For the alloy to have the same mechanical properties as the original aluminum base alloy (before contained boron), the amount of boron should preferably be 9% or less.

If a desired neutron shielding capacity is to be attained by containing original boron having an isotope composition composed of about 20% of $^{10}B$, it is necessary to increase the thickness of the aluminum base alloy containing boron or to increase the boron content in the alloy. Such countermeasures, however, offer the disadvantages mentioned above. Thus, for the aluminum base alloy containing B to have a satisfactory neutron absorbing capacity with a boron content from 0.5% to 10% which has no adverse effect on its mechanical properties, it is necessary that the relation of $^{10}B$ to the total amount of $^{10}B$ and $^{11}B$ should be 30% or more.

If this relation is less than 30%, the alloy with a normal thickness will not have the desired neutron absorbing capacity. On the other hand, as this ratio increases, the alloy has a larger neutron absorbing capacity; however, the alloy as a structural component needs a certain measure of thickness. In addition, containing $^{10}B$ (which is very expensive) in large amounts leads to a cost increase. Therefore, the ratio of $^{10}B/(^{10}B+^{11}B)$ should preferably be less than 95%.

As mentioned above, the present invention requires that the boron content and the ratio of $^{10}B$ in the aluminum base alloy containing boron should be properly controlled, so that the resulting alloy has an adequate neutron absorbing capacity and the same mechanical properties as the original aluminum base alloy before incorporation with boron. However, these requirements are not enough; depending on the state in which boron exists, the alloy used for the basket material may not have an adequate neutron absorbing capacity and mechanical properties required for storage of spent fuel for a long period of time.

For the aluminum base alloy containing boron to retain stable, good mechanical properties (such as high-temperature strength and creep strength) over a long period of time, it is necessary that the compound containing boron in the aluminum base alloy should have a size of 300 μm or less. The shape of the boron compound may be bulk, needle, plate, etc. The term "the size of the boron compound" as used in this specification means the maximum length in any direction (regardless of thickness or width). The boron compound larger than 300 μm in size will impair the mechanical properties (such as high-temperature strength and creep strength) of the alloy. It is desirable that the boron compound should be uniformly dispersed from the standpoint of neutron absorption. This object is easily accomplished if the boron compound is 300 μm or less in size. If the size exceeds this limit, the aluminum base alloy will not have a uniform neutron absorbing capacity.

The term "boron compound" as used in this specification means any boron compounds such as $AlB_2$, $AlB_{12}$, $TiB$, $CrB$, $FeB$, $B_2O_3$, and $B_4C$, which are not specifically restricted. These compounds are formed when boron is added to molten pool of Al alloy (Al-bath), or they may be previously prepared from raw materials (in powder form) and then added to the Al-bath. They are not restricted by their origin. Incidentally, it is not always necessary that all of the boron compounds have a size of 300 μm or less; the present invention will produce its effect if 80% or more of the boron compounds have a size of 300 μm or less.

The present inventors investigated the relation between the kind of the boron compound and the mechanical properties, paying special attention to Al—B compounds (such as $AlB_2$ and $AlB_{12}$) which dominate in the boron compounds that mentioned above. As the result, it was found that the present invention produces its effect when the compound has the size of 300 μm or less.

By the way, it is a general method to add the alloy elements such as Mg and Mn to the aluminum alloy to improve its mechanical properties. For example, Japanese Patent Laid-open No. 312043/1989 (mentioned above) specifies that the melting temperature should be higher than 1200° C. or more because "the Al—B—Mg intermetric compounds are formed at the melting temperature of 700–800° C., which causes the decrease in strength".

The present inventors carried out investigations in anticipation of containing the alloy elements (such as Mg and Mn) into the aluminum base alloy. As the result, it was found that the present invention produces its effect even though the Al—B—Mg intermetallic compounds are formed, if they are made extremely small in size under strict melting conditions. It was also found that the effect that mentioned above is achieved not only in the case of Al—B—Mg compounds but also in the case of boron compounds containing at least any of Mn, Si, Cu, etc. In other words, the effect of the present invention is achieved when applied to not only 5000 series or 6000 series aluminum alloy containing Mg as a major element but also 3000 series aluminum alloy containing Mn as a major element and 2000 series aluminum alloy containing Cu as a major element, if the boron compounds including such alloy elements into oneself have the specified size (300 μm or less) and the specified type (phase) of the intermetric compounds.

The boron compound containing at least one of the alloy elements that mentioned above (e.g., Mg, Mn, Si, and Cu) varies in boron distribution and size depending on its type. This in turn affects the neutron absorbing capacity and the high-temperature characteristics of the resulting alloy. According to the present invention, the type of the compound should preferably be such that the boron compound in which the total amount of these alloy elements is 0.01–50 atom % accounts for 50% or more (in terms of number) of the total amount of the boron compounds.

In other words, the present invention produces its effect as the boron compound is made smaller, if the total amount of alloying elements in the boron compound is 0.01 atom % or more, preferably 0.1 atom % or more. With a total content in excess of 50 atom %, the alloy elements do not demonstrate the effect of strengthening the parent material and hence the resulting alloy is poor in high-temperature strength. A more preferable upper limit value of the total content of the alloy elements is about 40 atom %.

The boron compound in which the total amount of the alloy elements is 0.01–50 atom % should account for 50% or more with number proportion of the total amount of the boron compounds, so that the effect of the present invention produced by making the boron compound make extremely small in size. A preferred lower limit of this ratio is about 55%.

The content of alloying elements (one or more species selected from Mg, Mn, Si, and Cu) in the boron compound and the ratio of the boron compound may be determined by using EPMA, SEM, FE-SEM, TEM, FE-TEM, etc. For accurate determination, it is desirable to select more than 100 samples.

The aluminum base alloy containing boron of the present invention has improved mechanical properties (such as high-temperature strength and creep strength) owing to the controlled size and type of the boron compounds. It is necessary that the alloy as a whole should have this effect uniformly. In other words, when the aluminum base alloy containing boron is applied to the practical use, the boron content should be uniform from one part to the other in the alloy component. The aluminum base alloy containing boron of the present invention involves the boron compound uniformly dispersed therein and hence contains boron almost uniformly throughout the alloy. For better reliability and more efficient design, it is necessary to adequately control the variation of the boron content in each part of the component.

The aluminum base alloy containing boron of the present invention is rolled, extruded, or forged according to use. No matter what the working process and the shape and dimension, the alloy should meet the requirement that the difference is 1.0% or less in the maximum and minimum value of the B quantity of the specimen that divided the alloy in the plural. Failure to meet this requirement leads to an alloy which varies in neutron absorbing capacity and mechanical properties. Such an alloy necessitates to increase the thickness of the component made from it, and thick of component are high in production cost and poor in efficiency of heat removal. This in turn requires that the component should have greater high temperature strength.

The manufacturing method according to the present invention is explained in the following. The aluminum base alloy containing boron of the present invention should be melted at 950° C. or above and cast at 800–950° C. The molten metal should be kept for 60–1800 seconds until it cools from 950° C. to its casting temperature.

According to the method mentioned above, the melting temperature should be 950° C. or above so that the boron compound has a size of 300 μm or less and is dispersed as uniformly as possible. For uniform dispersion of added boron, it is necessary that the added boron should be melted once in Al-melt at 950° C. or above. At a temperature 950° C. or below, the boron compound does not melt in the molten aluminum base alloy but remains in the coarse form in the ingot, adversely affecting the mechanical properties. The melting temperature should preferably be 960° C. or above.

In the case that it adds with the type of powder such as TiB or CrB as the addition form of the B material, here, the melting temperature is not necessarily limited to the temperature that exceeds 950° C. However, above temperature has technical significance with this viewpoint, because it is prefer to melt B in the powder material into Al-bath as a high temperature.

Casting that follows melting should be carried out at 800–950° C. If the casting temperature is lower than 800° C., the ingot solidifies in a short time, which contributes to uniform boron distribution in the ingot. On the other hand, the disadvantage of the low casting temperature is that the boron compound grows and becomes large in size before the casting temperature is reached. This adversely affects the decline of strength and elongation. By contrast, if the casting temperature is higher than 950° C., the ingot takes a long time before it solidifies and hence the boron compound settles down and aggregates (resulting in uneven boron distribution) although the boron compound becomes small in size. The casting temperature should preferably be about 820° C. at its lower limit and 930° C. at its upper limit.

The molten pool of aluminum base alloy should be kept for a specified period of time before it cools from 950° C. to the casting temperature, so as to effectively control the size of the boron compound. If this period is longer than specified, the boron compound grows in size. In other words, if this period is longer than 1800 seconds, the boron compound becomes larger than 300 μm and the resulting alloy is poor in mechanical properties. On the other hand, it is not sufficient to be demonstrate the effect stably in below 60 seconds. This period should preferably be about 120 seconds at its lower limit and about 1500 seconds at its upper limit.

The present invention specifies the melting temperature, the casting temperature, and the period for cooling from 950° C. to the casting temperature as mentioned above, so that the boron compound has an adequate size and boron is uniformly distributed in the aluminum base alloy containing boron. In addition to these requirements, it is also necessary to control the cooling rate of the molten alloy so as to improve the distribution of boron.

After casting, the molten alloy cools from the casting temperature to liquidus point at a certain rate. Low cooling rate causes the gravity segregation and aggregation of the boron compound. Most boron compounds have a larger specific gravity than the aluminum base alloy, and hence the boron compound settles during soldefication and this contributes to uniform distribution of boron in the aluminum base alloy. For this reason the cooling rate should be as large as possible, preferably 0.05° C./second or above.

High soldification rate (cooling rate from liquidus temperature to solidus temperature) is contribute to decrease the macro-segregation micro-segregation and gravity segregation of the boron compound which is crystallized as the aluminum matrix solidifies. Therefore, the freezing rate should be 0.01° C./second or above.

The method of casting of the aluminum base alloy containing boron according to the present invention is not specifically restricted so long as the requirements as mentioned above are met. Casting may be accomplished by ordinary semi-continuous casting, continuous casting, or mold casting. In the last case, it is desirable to use a cast iron mold, copper mold, or water-cooled mold.

The aluminum base alloy containing boron according to the present invention should be rolled or forged at 250–600° C. in such a way that the rate of reduction per pass is 40% or below and the total reduction is 50% or above. Working in this way causes the boron compound to reduce in size 300 μm or below and hence contributes to its uniform distribution in the aluminum base alloy. The working conditions that mentioned above are necessary for the alloy to uniformly contain the boron compound without cracking that might occur under ordinary working conditions. Uniform distribution of the boron compound is desirable for the improved neutron absorbing capacity and mechanical properties.

According to the manufacturing process of the present invention, the working temperature should be 250–600° C. At a working temperature lower than 250° C., the aluminum base alloy containing the boron compound is liable to edge cracking during rolling. On the other hand, working at a temperature higher than 600° C. causes seizing, thereby deteriorating the surface quality. Therefore, the working temperature should preferably be about 300° C. at its lower limit and about 550° C. at its upper limit.

The manufacturing method according to the present invention requires the specific working temperature as well as the specific reduction per pass as mentioned above. That is, the reduction per pass should be 40% or below so as to avoid edge cracking. The smaller is the reduction, the less is the aluminum base alloy subject to surface roughening. On the other hand, the small reduction causes the final working temperature to decrease. Therefore, the upper limit of the reduction should preferably be about 35%. However, the total reduction should be larger than 50% so that the boron compound is made 300 μm or below in size and is uniformly distributed in the aluminum base alloy.

The aluminum base alloy containing boron according to the present invention may be extruded at 400–550° C. so that the boron compound is dispersed uniformly in the form of fine particles 300 μm or below in size. Extrusion is an effective way of producing various products varying in cross section, ranging from simple plates and hollow pipes (rectangular pipes and the like) to complex profiles having R-corners. The method of extruding process is contribute to omission of the machine processing process and hence to cost reduction.

The aluminum base alloy containing boron of the present invention cannot be extruded by the method used for conventional extrusion method of aluminum base alloys into hollow pipes through a port hole die. (Extrusion through a port hole die forces more than one billet through an extrusion die in which extrudates are deposited together into a pipe.)

This method is process of making pipe form that one billet is divided into several parts in the entry die, and every parts pushes out by the die of pushing out exit, and join by pressure.

The condition for extrusion as mentioned above was established for satisfactory pressure welding. Extrusion at a temperature lower than 400° C. is poor in pressure welding performance and is subject to result extrusion clogging due to increased deformation stress. Extrusion at a temperature higher than 550° C. causes seizure which aggravates surface quality and dimensional accuracy.

The present invention does not specifically restrict the basic components of the aluminum base alloy. It covers ordinary aluminum base alloys, such as 6000 series, 5000 series, 4000 series, 3000 series, 2000 series, and 1000 series. These aluminum base alloys may contain Zn, Cr, Fe, etc. in small amounts not harmful to their characteristic properties. They may also contain inevitable impurities such as Mo, Nb, and Ni.

The aluminum base alloy containing boron in the form of ingot, plate, or extruded material may undergo heat treatment or cold rolling depending on its applications and strength required, as in the case of ordinary aluminum base alloys. Heat treatment produces good mechanical properties (such as tensile strength and ductility). For example, 6000 series alloys will acquire a very high tensile strength (300 MPa or above) if their hot working (such as rolling and extrusion) is followed by solution treatment (at 515–550° C.), quenching (water hardening), and age hardening (at 155–165° C.).

An ingot of the aluminum base alloy containing boron should be faced (3 mm or more from surface, preferably 3.5 mm) so that it can be processed into ingot, plates and extruded material having a good surface. Facing is necessary because the boron compound tends to segregate in the vicinity of the ingot surface and the segregate phase differs from the compound specified in the present invention. Moreover, the segregate phase causes an irregular surface in the anodizing surface treatment.

The invention will be understood more readily by reference to the following examples; however, these examples are intended to illustrate the invention and are not to be construed to limit the scope of the invention.

EXAMPLES

Example 1

6000 series alloys having the composition shown in Table 1 were changed into blocks of 300 mm in thickness under the conditions.

Melting temperature: 1050° C. Casting temperature: 900° C.

TABLE 1

| | Sample No. | $^{10}B/(^{10}B + ^{11}B)$ (mass %) | Chemical composition (mass %) | | | | | | | | |
|---|---|---|---|---|---|---|---|---|---|---|---|
| | | | B | Si | Mn | Cr | Cu | Zn | Mg | Ti | Fe |
| Example | 1 | 90 | 0.90 | 0.71 | 0.01 | 0.22 | 0.29 | 0 | 1.10 | 0.03 | 0.39 |
| | 2 | 90 | 0.90 | 0.71 | 0.01 | 0.22 | 0.29 | 0 | 1.10 | 0.03 | 0.39 |
| | 3 | 90 | 0.90 | 0.71 | 0.01 | 0.22 | 0.29 | 0 | 1.10 | 0.03 | 0.39 |

TABLE 1-continued

|  | Sample No. | $^{10}B/(^{10}B + ^{11}B)$ (mass %) | Chemical composition (mass %) | | | | | | | | |
|---|---|---|---|---|---|---|---|---|---|---|---|
|  |  |  | B | Si | Mn | Cr | Cu | Zn | Mg | Ti | Fe |
|  | 4 | 75 | 6.40 | 0.69 | 0.02 | 0.20 | 0.27 | 0.01 | 1.06 | 0.02 | 0.40 |
|  | 5 | 88 | 1.20 | 0.70 | 0.01 | 0.19 | 0.31 | 0.01 | 1.18 | 0.03 | 0.38 |
| Comparative | 6 | 25 | 2.60 | 0.71 | 0.01 | 0.22 | 0.29 | 0 | 1.10 | 0.03 | 0.39 |
| Example | 7 | 85 | 11.50 | 0.71 | 0.01 | 0.22 | 0.29 | 0 | 1.10 | 0.03 | 0.39 |
|  | 8 | 90 | 0.30 | 0.71 | 0.01 | 0.22 | 0.29 | 0 | 1.10 | 0.03 | 0.39 |
|  | 9 | 75 | 13.50 | 0.70 | 0.01 | 0.21 | 0.30 | 0.01 | 1.18 | 0.03 | 0.40 |
|  | 10 | 20 | 2.30 | 0.69 | 0.02 | 0.24 | 0.28 | 0.01 | 1.11 | 0.02 | 0.40 |

The ingots obtained in this way were soaked and they were hot rolled at 500° C. (starting temperature). There was obtained a 10-mm thick plate. The sequence of soaking and facing may be reversed; however, facing that follows soaking effectively removes surface oxides and hence contributes to a plate having a good surface. The hot-rolling may be preceded by forging to give a desired shape. Incidentally, these 6000 series alloys were processed by T6 treatment (a solution treatment at 530° C., for 1 hour and age hardening at 180° C. for 24 hours). The thus obtained plate of aluminum base alloy was examined for the following items.

[Measurement of the Size and Type (Phase) Shape of the Boron Compound]

Samples taken from the plate were examined for the size and type (phase) of the boron compound by using an SEM or SEM-EDX. The presence of boron in each compound was confirmed by EDX. The content (in terms of atom %) of components (such as Mg, Mn, Si, and Cu) in each boron compound was measured. The size of the boron compound is defined as the length of the longer axis (in the case of rectangular shape) or the maximum diameter (in the case of spherical shape). Incidentally, the number of measurements was 200.

[Tensile Test at Room Temperature]

A specimen conforming to JIS Z2201 No. 5 (25 w×50 GL×plate thickness) was taken from the plate as mentioned above in such a way that the length of the specimen is perpendicular to the rolling direction. This specimen was examined by tensile test at room temperature. The pulling rate was 1 MPa/sec until the offset yield strength for 0.2% elongation and then 20 mm/min. The specimen was also tested for offset yield strength (for 0.2% elongation) and elongation at room temperature (20° C.) according to JIS Z2241 (1980) describing the method of tensile test for metal materials.

[Tensile Test at High Temperatures]

Since nothing is specified in JIS for tensile test of aluminum base alloy at high temperatures, the method according to JIS G0567 (6 mm in diameter×30 GL) was employed. A specimen was taken in such a way that its length is perpendicular to the rolling direction. The pulling rate was 0.3%/min until the offset yield strength for 0.2% elongation and then 7.5%/min. The number of measurements was 9. The test was carried out at 200° C. The specimen was also tested for offset yield strength (for 0.2% elongation) and elongation.

[Creep Characteristics]

Creep rupture test at high temperatures was carried out according to JIS Z2271 (1978). The specimen is a round rod, 6 mm in diameter, and the specimen was taken in such a way that its length is perpendicular to the rolling direction. The test was carried out at 200° C. under a load of 5 kg/mm$^2$, and time required for rupture to occur was measured. The specimen was rated according to the following criterion.

○: rupture occurred after 10 hours.

X: rupture occurred within 10 hours.

[Assessment of Boron Distribution]

Samples were taken from the head and tail ends and the center and edges (in the widthwise direction) of the plate. They were analyzed by ICP emission spectroscopy. They were rated in terms of the difference between the maximum and minimum values according to the following criterion.

⊙: 0.05% or below

○: 1.0% or below

X: more than 1.0%

The results of the tests are shown in Table 2. It is noted from the table that the samples Nos. 1 to 5 (which are aluminum base alloy containing boron meeting the requirements of the present invention) are good in high-temperature strength and creep characteristics. By contrast, those samples Nos. 6 to 10 (which are aluminum base alloys not meeting the requirements of the present invention) contain the boron compound in coarse form, alloy elements in large amount, and unevenly distributed boron.

TABLE 2

| | | | | Strength at room temperature | | | High-temperature strength | | | | | |
|---|---|---|---|---|---|---|---|---|---|---|---|---|
| No. | Size of boron compound (µm) | Amount of alloying elements (atom %) | Major alloying element | Strength (MPa) | Offset yield strength (MPa) | Elongation (%) | Strength (MPa) | Offset yield strength (MPa) | Elongation (%) | Creep characteristics | Boron distribution | Problem |
| 1 | 190 | 24 | Mg | 325 | 291 | 13.3 | 220 | 203 | 12.5 | ○ | ○ | — |
| 2 | 80 | 8 | Mg | 340 | 310 | 14.4 | 230 | 215 | 13.6 | ○ | ○ | — |
| 3 | 250 | 35 | Mg | 320 | 278 | 12.1 | 217 | 200 | 11.4 | ○ | ○ | — |
| 4 | 45 | 3 | Mg | 345 | 312 | 14.8 | 236 | 219 | 14.0 | ○ | ○ | — |

TABLE 2-continued

| No. | Size of boron compound (μm) | Amount of alloying elements (atom %) | Major alloying element | Strength at room temperature | | | High-temperature strength | | | Creep charac-teristics | Boron distribu-tion | Problem |
|---|---|---|---|---|---|---|---|---|---|---|---|---|
| | | | | Strength (MPa) | Offset yield strength (MPa) | Elongation (%) | Strength (MPa) | Offset yield strength (MPa) | Elongation (%) | | | |
| 5 | 130 | 13 | Mg | 337 | 307 | 13.0 | 224 | 208 | 12.9 | ○ | ○ | — |
| 6 | 50 | 7 | Mg | 341 | 309 | 14.6 | 232 | 217 | 14.0 | ○ | ○ | 1) |
| 7 | 360 | 47 | Mg | 301 | 273 | 9.7 | 210 | 192 | 9.6 | X | ○ | 2) |
| 8 | 200 | 29 | Mg | 323 | 289 | 13.1 | 220 | 202 | 11.9 | ○ | ○ | 1) |
| 9 | 420 | 68 | Mg | 295 | 269 | 8.9 | 204 | 188 | 9.0 | X | ○ | 2) |
| 10 | 40 | 4 | Mg | 346 | 314 | 14.7 | 237 | 222 | 14.2 | ○ | ○ | 1) |

1) Neutron absorbing capacity
2) Strength and elongation

Example 2

The same procedure as in Example 1 was repeated to produce ingots, except that the aluminum base alloy was replaced by 5000 series one having the composition as shown in Table 3.

The thus obtained ingots were soaked and they were hot rolled at starting temperature of 500° C. into 10-mm thick plates. Incidentally, the 5000 series alloys were processed by a H34 treatment and then evaluated according to the same criterion as in Example 1. The results are shown in Table 4. It is noted that the results are the same as those in Example 1.

Example 3

The same procedure as in Example 1 was repeated to produce ingots, except that the aluminum base alloy was replaced by 3000 series one having the composition as shown in Table 5.

The thus obtained ingots were soaked and they were hot rolled at the starting temperature of 500° C. into 10-mm thick plates. Incidentally, the 3000 series alloys were processed by a H34 treatment and then evaluated according to the same criterion as in Example 1. The results are shown in Table 6. It is noted that the results are the same as those in Example 1.

TABLE 3

| | Sample No. | $^{10}B/(^{10}B + ^{11}B)$ (mass %) | Chemical composition (mass %) | | | | | | | | |
|---|---|---|---|---|---|---|---|---|---|---|---|
| | | | B | Si | Mn | Cr | Cu | Zn | Mg | Ti | Fe |
| Example | 1 | 83 | 1.10 | 0.21 | 0.02 | 0.18 | 0.08 | 0.05 | 2.50 | 0.01 | 0.30 |
| | 2 | 83 | 1.10 | 0.21 | 0.02 | 0.18 | 0.08 | 0.05 | 2.50 | 0.01 | 0.30 |
| | 3 | 83 | 1.10 | 0.21 | 0.02 | 0.18 | 0.08 | 0.05 | 2.50 | 0.01 | 0.30 |
| | 4 | 90 | 0.85 | 0.23 | 0.01 | 0.17 | 0.09 | 0.04 | 2.53 | 0.02 | 0.32 |
| | 5 | 75 | 8.20 | 0.19 | 0.01 | 0.18 | 0.10 | 0.05 | 2.49 | 0.01 | 0.29 |
| Comparative Example | 6 | 20 | 2.10 | 0.21 | 0.02 | 0.18 | 0.08 | 0.05 | 2.50 | 0.01 | 0.30 |
| | 7 | 70 | 0.30 | 0.21 | 0.02 | 0.18 | 0.08 | 0.05 | 2.50 | 0.01 | 0.30 |
| | 8 | 90 | 13.80 | 0.21 | 0.02 | 0.18 | 0.08 | 0.05 | 2.50 | 0.01 | 0.30 |
| | 9 | 80 | 11.45 | 0.23 | 0.01 | 0.19 | 0.09 | 0.04 | 2.53 | 0.02 | 0.29 |
| | 10 | 25 | 2.36 | 0.20 | 0.01 | 0.17 | 0.08 | 0.03 | 2.48 | 0.01 | 0.31 |

TABLE 4

| No. | Size of boron compound (μm) | Amount of alloying elements (atom %) | Major alloying element | Strength at room temperature | | | High-temperature strength | | | Creep charac-teristics | Boron distribu-tion | Problem |
|---|---|---|---|---|---|---|---|---|---|---|---|---|
| | | | | Strength (MPa) | Offset yield strength (MPa) | Elongation (%) | Strength (MPa) | Offset yield strength (MPa) | Elongation (%) | | | |
| 1 | 120 | 8 | Mg | 268 | 231 | 9.5 | 165 | 125 | 8.9 | ○ | ○ | — |
| 2 | 30 | 19 | Mg | 280 | 240 | 10.4 | 170 | 130 | 9.3 | ○ | ○ | — |
| 3 | 190 | 6 | Mg | 266 | 229 | 9.1 | 160 | 120 | 8.4 | ○ | ○ | — |
| 4 | 50 | 17 | Mg | 275 | 237 | 10.1 | 173 | 127 | 9.3 | ○ | ○ | — |
| 5 | 100 | 10 | Mg | 271 | 233 | 9.7 | 166 | 125 | 9.0 | ○ | ○ | — |
| 6 | 90 | 6 | Mg | 271 | 234 | 9.8 | 167 | 125 | 9.0 | ○ | ○ | 1) |
| 7 | 150 | 65 | Mg | 267 | 230 | 9.3 | 163 | 122 | 8.7 | ○ | ○ | 1) |
| 8 | 410 | 21 | Mg | 245 | 205 | 7.4 | 143 | 106 | 6.9 | X | ○ | 2) |
| 9 | 350 | 18 | Mg | 250 | 216 | 7.9 | 150 | 115 | 7.3 | X | ○ | 2) |
| 10 | 40 | 5 | Mg | 278 | 238 | 10.0 | 171 | 128 | 9.3 | ○ | ○ | 1) |

1) Neutron absorbing capacity
2) Strength and elongation

TABLE 5

| | Sample No. | $^{10}B/(^{10}B + ^{11}B)$ (mass %) | Chemical composition (mass %) | | | | | | | | |
|---|---|---|---|---|---|---|---|---|---|---|---|
| | | | B | Si | Mn | Cr | Cu | Zn | Mg | Ti | Fe |
| Example | 1 | 94 | 0.95 | 0.22 | 1.25 | 0.01 | 0.18 | 0.17 | 1.10 | 0.02 | 0.62 |
| | 2 | 94 | 0.95 | 0.22 | 1.25 | 0.01 | 0.18 | 0.17 | 1.10 | 0.02 | 0.62 |
| | 3 | 94 | 0.95 | 0.22 | 1.25 | 0.01 | 0.18 | 0.17 | 1.10 | 0.02 | 0.62 |
| | 4 | 94 | 1.80 | 0.22 | 1.23 | 0.01 | 0.16 | 0.17 | 1.12 | 0.03 | 0.60 |
| | 5 | 94 | 0.75 | 0.24 | 1.24 | 0.02 | 0.19 | 0.18 | 1.08 | 0.01 | 0.65 |
| Comparative Example | 6 | 25 | 2.90 | 0.21 | 1.21 | 0.01 | 0.17 | 0.18 | 1.11 | 0.02 | 0.63 |
| | 7 | 85 | 11.50 | 0.21 | 1.21 | 0.01 | 0.17 | 0.18 | 1.11 | 0.02 | 0.63 |
| | 8 | 20 | 2.20 | 0.21 | 1.21 | 0.01 | 0.17 | 0.18 | 1.11 | 0.02 | 0.63 |
| | 9 | 80 | 10.50 | 0.23 | 1.20 | 0.01 | 0.20 | 0.16 | 1.13 | 0.01 | 0.59 |
| | 10 | 70 | 0.20 | 0.23 | 1.20 | 0.01 | 0.20 | 0.16 | 1.13 | 0.01 | 0.59 |

TABLE 6

| | | | | Strength at room temperature | | | High-temperature strength | | | | | |
|---|---|---|---|---|---|---|---|---|---|---|---|---|
| No. | Size of boron compound (μm) | Amount of alloying elements (atom %) | Major alloying element | Strength (MPa) | Offset yield strength (MPa) | Elongation (%) | Strength (MPa) | Offset yield strength (MPa) | Elongation (%) | Creep characteristics | Boron distribution | Problem |
| 1 | 225 | 14 | Mg | 247 | 200 | 8.8 | 151 | 115 | 8.0 | ○ | ○ | — |
| 2 | 50 | 17 | Mg | 261 | 217 | 9.7 | 160 | 124 | 8.8 | ○ | ○ | — |
| 3 | 100 | 13 | Mg | 257 | 212 | 9.3 | 157 | 120 | 8.5 | ○ | ○ | — |
| 4 | 190 | 7 | Mg | 251 | 205 | 8.9 | 153 | 116 | 8.2 | ○ | ○ | — |
| 5 | 20 | 25 | Mg | 265 | 220 | 10.0 | 162 | 125 | 9.0 | ○ | ○ | — |
| 6 | 90 | 6 | Mg | 258 | 213 | 9.4 | 158 | 120 | 8.5 | ○ | ○ | 1) |
| 7 | 350 | 15 | Mg | 238 | 192 | 7.7 | 143 | 105 | 7.4 | X | ○ | 2) |
| 8 | 60 | 6 | Mg | 260 | 215 | 9.5 | 159 | 123 | 8.6 | ○ | ○ | 1) |
| 9 | 400 | 11 | Mg | 230 | 185 | 7.1 | 138 | 98 | 6.9 | X | ○ | 2) |
| 10 | 150 | 58 | Mg | 254 | 209 | 9.1 | 154 | 118 | 8.3 | ○ | ○ | 1) |

1) Neutron absorbing capacity
2) Strength and elongation

Example 4

The 6000 series aluminum base alloy, No. 1, shown in Table 1 was cast into ingots under the conditions shown in Table 7. The ingots were soaked, and they were hot rolled or hot-extruded to be made into plates.

The thus obtained plates were processed by a T6 treatment (solution treatment at 530° C. for 1 hour and age hardening at 180° C. for 24 hours) and then evaluated according to the same criterion as in Example 1. The thus obtained plates were examined for surface state and rated according to the following criterion.

○: no cracking occurred.
X: cracking occurred.

The results are shown in Table 8. It is noted that all the aluminum base alloys (designated as A to E) meeting the requirements of the present invention are superior in strength and ductility, with the boron compound having a small size. It is also noted that hot-rolling in the way specified in the present invention results in uniform boron distribution and good surface state. By contrast, those aluminum base alloys (designated as F to J) not meeting the requirements of the present invention suffered increase in size of the boron compound, decrease in ductility, surface roughening, and uneven boron distribution.

TABLE 7

| | Code | Melting temperature (° C.) | Casting temperature (° C.) | Time for cooling from 950° C. to casting temperature (s) | Rolling or extruding conditions | | |
|---|---|---|---|---|---|---|---|
| | | | | | Process | Working temperature (° C.) | Maximum reduction (%) |
| Example | A | 1020 | 900 | 690 | Rolling | 500 | 30 |
| | B | 1050 | 930 | 360 | Rolling | 400 | 24 |
| | C | 1005 | 840 | 1250 | Rolling | 460 | 35 |
| | D | 1035 | 870 | 990 | Extrusion | 520 | — |
| | E | 1080 | 900 | 705 | Extrusion | 480 | — |
| Comparative Example | F | 1030 | 930 | 450 | Rolling | 600 | 50 |
| | G | 1050 | 990 | — | Rolling | 510 | 29 |
| | H | 1010 | 830 | 2500 | Rolling | 430 | 30 |
| | I | 920 | 850 | — | Extrusion | 490 | — |
| | J | 1005 | 900 | 1000 | Extrusion | 250 | — |

TABLE 8

| No. | Size of boron compound (μm) | Amount of alloying elements (atom %) | Major alloying element | Strength at room temperature | | | High-temperature strength | | | Creep charac- teristics | Boron distribu- tion | Surface state | Problem |
|---|---|---|---|---|---|---|---|---|---|---|---|---|---|
| | | | | Strength (MPa) | Offset yield strength (MPa) | Elongation (%) | Strength (MPa) | Offset yield strength (MPa) | Elongation (%) | | | | |
| A | 50 | 9 | Mg | 337 | 306 | 14.6 | 255 | 226 | 13.9 | ○ | ◎ | ○ | — |
| B | 90 | 14 | Mg | 331 | 300 | 14.2 | 250 | 221 | 13.3 | ○ | ◎ | ○ | — |
| C | 210 | 34 | Mg | 320 | 291 | 13.0 | 240 | 210 | 12.7 | ○ | ◎ | ○ | — |
| D | 160 | 22 | Mg | 326 | 295 | 13.4 | 246 | 215 | 13.0 | ○ | ◎ | ○ | — |
| E | 30 | 7 | Mg | 340 | 308 | 15.0 | 260 | 230 | 14.1 | ○ | ◎ | ○ | — |
| F | 85 | 11 | Mg | 330 | 300 | 14.3 | 250 | 222 | 13.4 | ○ | ○ | X | 1) |
| G | 25 | 6 | Mg | 341 | 308 | 15.0 | 262 | 230 | 14.2 | ○ | X | ○ | 2) |
| H | 500 | 75 | Mg | 297 | 269 | 9.9 | 217 | 188 | 9.4 | X | X | ○ | 3) |
| I | 410 | 58 | Mg | 305 | 278 | 9.2 | 226 | 198 | 8.8 | X | X | ○ | 4) |
| J | 120 | 16 | Mg | 328 | 296 | 13.9 | 248 | 218 | 12.9 | ○ | ○ | X | 5) |

1) Reduction
2) Casting temperature
3) Time to casting
4) Melting temperature
5) Working temperature

[Effect of the Invention]

The aluminum base alloy containing boron of the present invention exhibits good mechanical properties (such as high-temperature strength and creep strength) over a long period of time. It also has a neutron absorbing capacity, with boron in the form of compound uniformly distributed therein without segregation.

What is claimed is:

1. An aluminum base alloy containing 0.5–1.8 mass % of boron with an isotopic element satisfying a relation of 95%>$^{10}$B/($^{10}$B+$^{11}$B)≧75%, wherein
    said boron is present in the form of particles of a boron-compound, containing, in addition to aluminum and boron, at least one element selected from the group consisting of Mg, Mn, Si and Cu;
    the total amount in said boron-compound of the at least one element selected from the group consisting of Mg, Mn, Si and Cu is 0.01–50 atom %; and
    said particles are 250 μm or below in size.

2. The aluminum base alloy according to claim 1, wherein the difference between the maximum and minimum values of the B quantity of the specimens taken after dividing the alloy into a plurality of specimens is 1.0% or less.

3. A method for manufacturing the aluminum base alloy of claim 1, said method comprising
    melting aluminum, boron and at least one element selected from the group consisting of Mg, Mn, Si and Cu at a temperature in excess of 950° C., and
    casting the resulting melt at a temperature in the range of 800° C. to 950° C., in such a way that the molten metal is kept for 60–1800 seconds until it cools from 950° C. to the casting temperature.

4. The method according to claim 3, said method further comprising rolling or forging the cast alloy at 250–600° C. in such a way that the rate of reduction per pass is 40% or below and the total reduction is 50% or more.

5. The method according to claim 3, said method further comprising extruding the cast alloy at 400–550° C.

* * * * *